Figure 1:
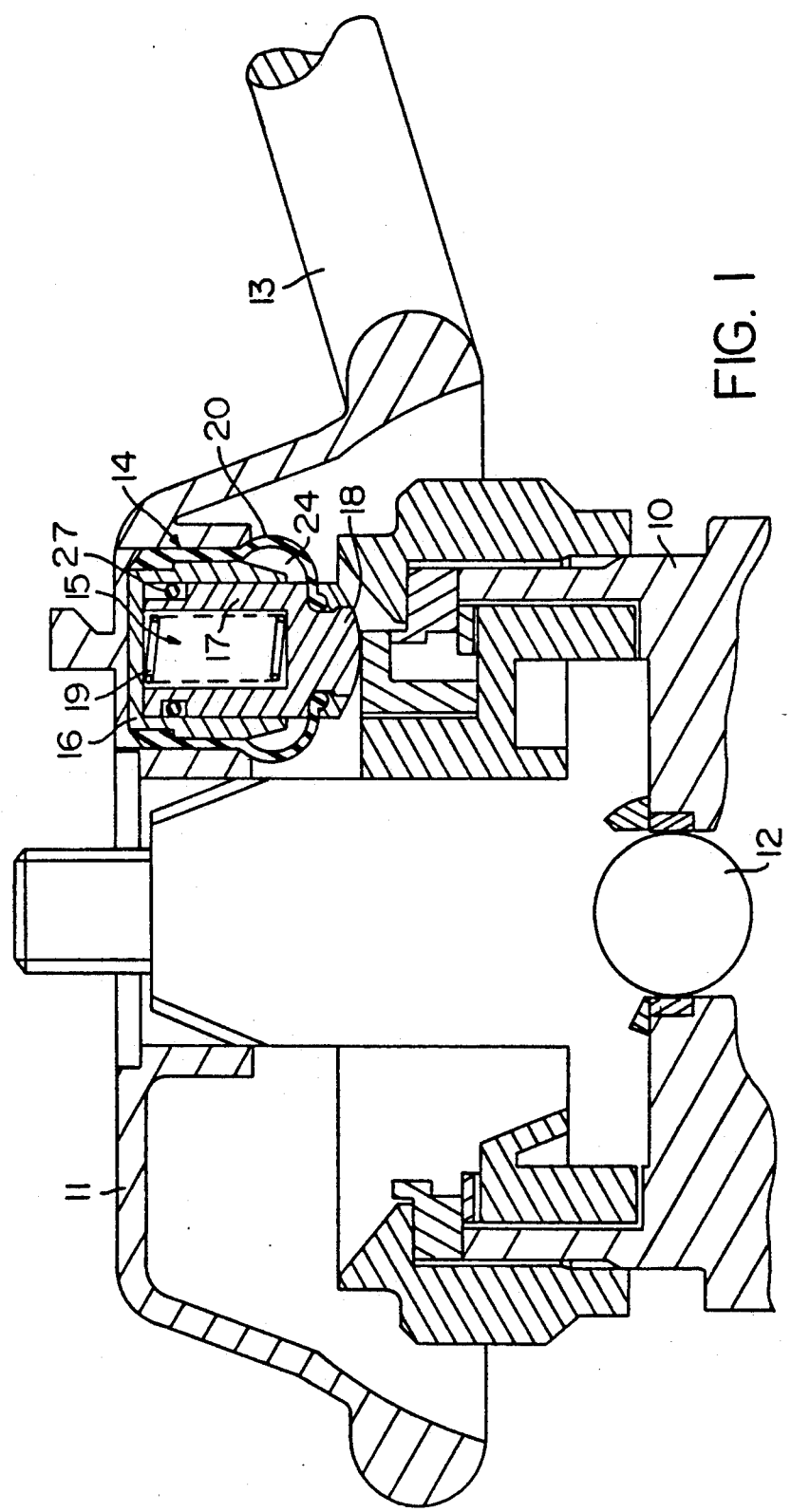

United States Patent [19]
Bergmann

[11] Patent Number: 5,301,716
[45] Date of Patent: Apr. 12, 1994

[54] CLOSURE DAMPER FOR A SANITARY WATER FITTING

[75] Inventor: Konrad Bergmann, Wittlich, Fed. Rep. of Germany

[73] Assignee: American Standard Inc., New York, N.Y.

[21] Appl. No.: 916,872

[22] PCT Filed: Jan. 18, 1991

[86] PCT No.: PCT/DE91/00045
§ 371 Date: Aug. 11, 1992
§ 102(e) Date: Aug. 11, 1992

[87] PCT Pub. No.: WO91/12454
PCT Pub. Date: Aug. 22, 1991

[30] Foreign Application Priority Data
Feb. 15, 1990 [DE] Fed. Rep. of Germany ....... 4004700

[51] Int. Cl.⁵ .................... F16K 11/06; F16K 31/72
[52] U.S. Cl. .................... 137/625.17; 137/625.4; 251/54; 188/298; 188/322.18
[58] Field of Search ............ 137/625.17, 625.4; 251/54; 188/298, 322.11, 322.12, 322.18, 322.19

[56] References Cited
U.S. PATENT DOCUMENTS

| | | | |
|---|---|---|---|
| 2,163,255 | 6/1939 | Binder et al. | 188/322.12 |
| 2,580,433 | 1/1952 | Kain | 251/54 X |
| 2,781,519 | 2/1957 | Marchant | 251/54 |
| 3,891,199 | 6/1975 | Willich et al. | 188/298 X |
| 4,112,966 | 9/1978 | Carlson | 251/54 X |
| 4,723,574 | 2/1988 | Bergmann et al. | 137/625.17 |
| 4,736,772 | 4/1988 | Ostertag et al. | 137/625.17 |
| 4,936,347 | 6/1990 | Oracz et al. | 251/54 X |
| 5,012,551 | 5/1991 | Beneke et al. | 16/49 |

FOREIGN PATENT DOCUMENTS
WO88/03240 5/1988 PCT Int'l Appl.

Primary Examiner—John Rivell
Attorney, Agent, or Firm—Elaine Brenner Robinson; Ann M. Knab

[57] ABSTRACT

A suitable design is given of a closure damper for a sanitary water fitting, especially in the form of a single-handle mixing unit, with a casing, an activation handle, and with a control unit presenting a disk, piston, balls, or the like, as well as a closure damper to extend the closure time and reduce the closure rate arranged between the handle and the fitting casing, whereby the closure damper is designed as a piston and cylinder unit. It is provided for watertight membrane (20) to surround piston and cylidner unit (16, 17) outside, connected with cylinder (16) on the one hand and piston (17) on the other, watertight in both cases, which forms membrane chamber (24) when piston (17) is pushed in, and a flow connection exists between inside space (25) of cylinder (16) sealed against piston (17) and the outside of cylinder (16) encircled by membrane (20).

9 Claims, 2 Drawing Sheets

CLOSURE DAMPER FOR A SANITARY WATER FITTING

The invention relates to a sanitary water fitting, especially in the form of a single-handle mixing unit, with a casing, an activation handle, and with a control unit presenting a disk, piston, balls, or the like, as well as with a closing damper to extend the closure time and reduce the closure rate arranged between the handle and the fitting casing, whereby the closure damper is designed as a liquid-filled piston and cylinder unit.

A water fitting of this type is described in EP-0 214 358 B1, whereby a closure damper is arranged between the handle and the control unit or between the handle and the fitting housing, which provides for a prolonging of the closure time and a reduction of the closure rate. The document is limited with respect to its solution proposal for the concrete designing of the closure damper to referring to a piston and cylinder unit in which especially liquid is compressed between the damper piston and the damper cylinder, which in the final phase of the closure process of the sanitary water fitting of this type necessarily leads to a prolongation of the closure time and reduction of the closure rate, without this being disturbing to the user.

The object of the present invention is therefore, in an extension of the water fitting of this type, to provide an expanded solution proposal for the suitable designing of the piston and cylinder unit as a closure damper.

The solution of this task, including advantageous designs and extensions, appears in the contents of the claims accompanying this specification.

In its basic concept, the invention proposes a liquid-tight membrane surrounding the piston and cylinder unit outside connecting with the cylinder on the one hand and the piston on the other, watertight in both cases, which forms a membrane chamber when the piston is pushed in, and for a flow connection to exist between the inside space of the cylinder sealed against the piston and its outside surrounded by the membrane. The concept of an exclusive compression of the liquid in the closure movement is thereby abandoned, because the liquid in the cylinder space at first compressed in the compression movement of the piston over a definite flow route into a membrane chamber formed by a liquid-tight membrane enclosing the piston and cylinder unit outside is expelled and flows back into the inside space in the exahust movement of the piston. This entails the advantage that the closure damper is more adjustable in its damping behavior in the closure movement of the fitting, and it assumes its initial position for the closure movement more rapidly in the opening of the water fitting, since the liquid can rapidly flow back into the cylinder inside space.

One execution example of the invention provides for the purpose for the piston to be sealed liquid-tight against the cylinder by means of a sealing ring inserted into an encircling piston groove, whereby the groove presents a notch for designing a flow connection from the cylinder inside space with the membrane chamber arranged at the outside going around the sealing ring over one peripheral section. This assures the possibility of the liquid being able to flow back at the sealing ring into the cylinder inside space in the compression and exhaust movements of the piston. For this purpose, the specified height of the piston groove in the movement direction of the piston is greater than the diameter of the sealing ring, so that the sealing ring is suitably shifted according to the compression and exhaust movements of the piston against the cylinder and more or less releases the flow connection created by the notch design.

It is proposed according to one execution example of the invention for the notch to consist of a deepening of the piston groove on the piston side and for it to extend until the end of the piston. It is advantageous in this connection, according to one form of execution of the invention, for the notch to overtop the assigned upper edge of the piston groove with a section narrowing in the exhaust direction of the piston, because this makes certain that the notch cannot be completely closed in the shifting of the sealing ring in the groove, so that a blocking of the piston movement is excluded According to a preferred execution example of the invention, the usual structural tolerances of the piston on the one hand and the cylinder on the other suffice as a flow connection between the cylinder inside space and the membrane chamber in the area of the reciprocal arrangement of piston and cylinder because, after passing through the notch and flowing past the sealing ring, the liquid expands in the ring space located between piston outside and cylinder inside and can flow from there into the membrane chamber. However, the invention also covers providing a flow route by means of a depression of the piston or cylinder wall in a continuation of the notch.

In addition, the piston is loaded in its exhaust position by a spring arranged between piston and cylinder, which corresponds to the opening position of the water fitting.

One form of execution of the invention is presented in the drawing, which is described below.

Figure 2:
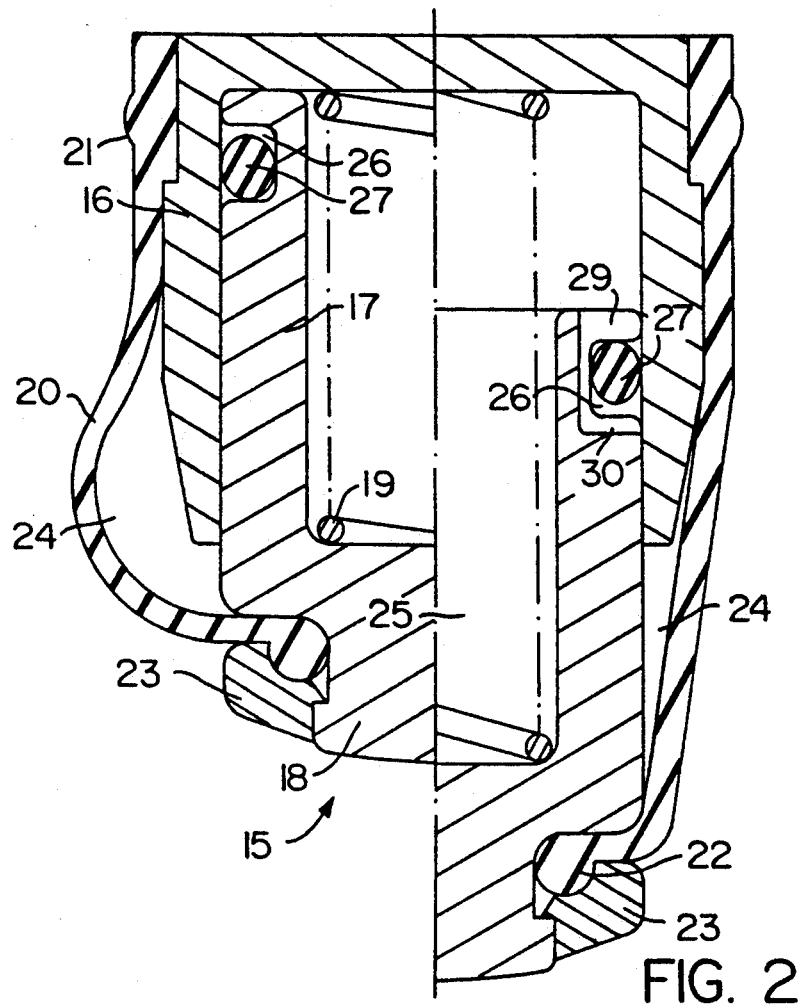
Figure 3:
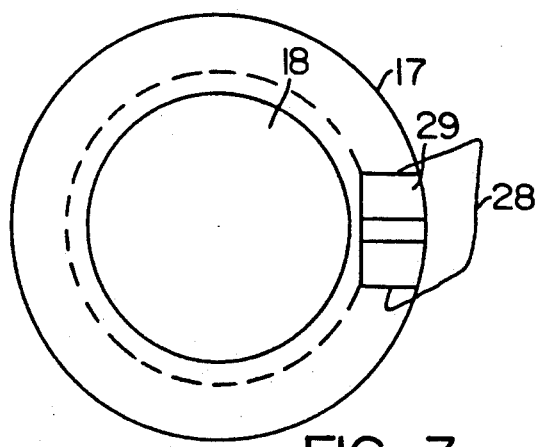
Figure 4:
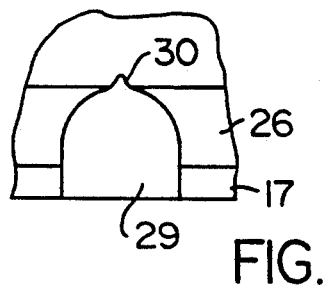

The following features are shown:

FIG. 1 the cap-shaped part of the handle lever of a water fitting with closure damper in section;

FIG. 2 the closure damper in an enlarged representation in section in partly closed and partly open representation;

FIG. 3 a top view of the piston of the closure damper;

FIG. 4 an extracted side view of the notch formed in the piston groove.

Handle cap 11 is arranged on the upper part of casing 10 capable of swinging around shaft 12, which can be activated by handle lever 13. Closure damper 15 is pressed into its pressure seat in hole 14 arranged on the inside of handle cap 11; it consists of cylinder 16 and piston 17 movable in it with compression and exhaust movements. Piston 17 is supported at casing 10 with upper projection 18 and is loaded in its exhaust position by spring 19 supported between cylinder 16 and piston 17.

Closure damper 15 appears in a clearer representation in FIG. 2. A liquid-tight membrane is arranged on its outside, which is attached with one end on the one hand with a projection engaging a rear section of cylinder 16, and on the other hand it presents elevation 21 projecting outside, so that a strong and liquid-tight connection between cylinder 16 and membrane 20 is created by pressing the cylinder of closure damper 15 into assigned hole 14 of handle cap 11. The other end of membrane 20 with projection 22 is connected liquid-tight with piston 17 by means of shim 23. Membrane 20 is dimensioned so that it follows the compression and exhaust movements of piston 17 and forms membrane chamber 24 because of its dimensioning when the piston is pushed in, whereas it is on the outside of cylinder 16 or piston 17 when piston 17 is pulled out.

Cylinder 16 and piston 17 are each designed in U-form with their open sides capable of being inserted one into the other, so that cylinder space 25 results as a sufficient liquid reservoir. Piston 17 presents piston groove 26 on its outside, into which an O-ring is inserted as sealing ring 27. The depth of the groove is dimensioned so that a liquid-tight sealing of the components against each other results in the movements of piston 17 and cylinder 16 against each other. The height of groove 26 is dimensioned greater in the movement direction of piston 17 than the diameter of sealing ring 27, so that a shifting of sealing ring 27 in piston groove 26 according to the compression or exhaust movement of piston 17 results in the movement of piston 17 against cylinder 16.

Piston groove 26 is overlaid by notch 29 over peripheral section 28 (FIG. 3); it extends from the end of piston 17 until over piston groove 26, and it narrows into part 30 projecting over piston groove 26 in the exhaust direction of piston 17. The depth of notch 29 is dimensioned to be greater than the depth of piston groove 26 so that, with placement of sealing ring 27 with prestress into groove 26 for placement at the cylinder wall, a flow route to membrane chamber 24 results at the outside of cylinder 16 between sealing ring 27 and piston 17 in the area of notch 29. The structural tolerances of the components at the flow route associated with notch 29 in the area of the reciprocal positioning of cylinder 16 and piston 17 are sufficient for the purpose, because the liquid can flow into outside membrane chamber 24 after passage through notch 29 over the peripheral surface of piston 17.

The closure damper according to the invention functions as follows: On closure of the sanitary water fitting by pressure on handle lever 13, piston 17 passes into cylinder 16, so that liquid located in cylinder inside space 25 is displaced and flows through notch 29 already beginning at the piston end between sealing ring 27 and piston 17 as well as section 30 of the notch and the gap between piston 17 and cylinder 16 into membrane chamber 24 created by the arching of membrane 20. In case of a high closure rate by a sudden pressing down of handle lever 13, sealing ring 27 shifts in groove 26 for positioning at its upper end because of the increasing liquid pressure, and the flow cross-section of notch 29 is thereby narrowed, so that the closure rate is reduced. Because sealing ring 27 cannot completely close notch 29 due to section 30, however, a blocking of this flow route is excluded even in case of a sudden closure of the water fitting.

If the water fitting is opened by movement of handle lever 13 into its open position, piston 17 follows the opening movement because of the action of spring 19, whereby water flows past from membrane chamber 24 through the gap between piston 17 and cylinder 16 at sealing ring 27 into cylinder inside space 25. In the case of this flow direction of the water, sealing ring 27 is pressed down into its groove 26, so that it releases the full flow cross-section of notch 29, and consequently an unhindered rapid opening of the fitting results.

It is understood that the application of the closure damper according to the invention can be applied not only to single-handle mixing units but also to double-handle fittings.

The characteristics of the object of these documents disclosed in the above specification, the claims, the summary, and the drawing can be essential for the execution of the invention in its various forms of execution individually as well as combined with each other in any desired combinations.

I claim:

1. A water faucet comprising a casing having inlet means for receiving water and outlet means for discharging said received water, control means for selectively controlling said water including a handle for actuating said control means, damper means arranged intermediate said handle and said casing for damping said control means when actuated by said handle, said damper means including a cylinder and a piston slidably supported in said cylinder and defining a first chamber therebetween having a fluid therein, a fluid tight flexible membrane surrounding and coupled to said cylinder and said piston to define a membrane chamber, said membrane chamber being open to the flow of said fluid from and to said first chamber as said piston is slidably moved with respect to said cylinder, said cylinder including an inner surface, said piston including an outer surface having an annular groove formed therein, and a sealing ring supported in said groove and pressing against said inner surface of said cylinder, said groove further defining a notch which provides a fluid connection between said first chamber and said membrane chamber.

2. The water faucet as claimed in claim 1, wherein the length of said groove in the direction of movement of said piston is greater than the diameter of said sealing ring.

3. The water faucet as claimed in claim 1, wherein said piston includes an edge in said cylinder, said notch being formed as an inward extension of said annular groove which extends to the edge of said piston.

4. The water faucet as claimed in claim 1, wherein said notch extends beyond said annular groove and defines a narrow portion.

5. The water faucet as claimed in claim 1, wherein the flow of fluid between said first chamber and said membrane chamber is partly controlled by the dimensional tolerances of said piston sliding in said cylinder.

6. The water faucet as claimed in claim 1, wherein one of said inner surface of said cylinder and said outer surface of said piston includes a longitudinal groove therein to permit the flow of fluid from said first chamber to said membrane chamber.

7. The water faucet as claimed in claim 1, further comprising biasing means in said first chamber for biasing said piston against said cylinder.

8. The water faucet as claimed in claim 7, wherein said biasing means is a spring.

9. The water faucet as claimed in claim 1, wherein said fluid is air.

* * * * *